United States Patent
Menai et al.

(10) Patent No.: US 10,440,142 B2
(45) Date of Patent: Oct. 8, 2019

(54) AUTOMATED TTL ADJUSTMENT USING CACHE PERFORMANCE AND PURGE DATA

(71) Applicant: Akamai Technologies, Inc., Cambridge, MA (US)

(72) Inventors: Alexandre Menai, Wilmington, MA (US); Charles Patrick Dublin, Wellesley, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 36 days.

(21) Appl. No.: 15/912,862

(22) Filed: Mar. 6, 2018

(65) Prior Publication Data

US 2019/0281129 A1    Sep. 12, 2019

(51) Int. Cl.
*H04L 12/26* (2006.01)
*H04L 29/08* (2006.01)

(52) U.S. Cl.
CPC ...... *H04L 67/2852* (2013.01); *H04L 43/0876* (2013.01)

(58) Field of Classification Search
CPC . H04L 43/0876; H04L 67/28; H04L 67/2842; H04L 67/2852
See application file for complete search history.

(56) References Cited

U.S. PATENT DOCUMENTS

| | | | |
|---|---|---|---|
| 6,820,133 B1 | 11/2004 | Grove et al. | |
| 7,111,057 B1 | 9/2006 | Wein et al. | |
| 7,240,100 B1 | 7/2007 | Wein et al. | |
| 7,274,658 B2 | 9/2007 | Bornstein et al. | |
| 7,296,082 B2 | 11/2007 | Leighton et al. | |
| 7,376,716 B2 | 5/2008 | Dilley et al. | |
| 7,472,178 B2 | 12/2008 | Lisiecki et al. | |
| 7,660,296 B2 | 2/2010 | Fletcher et al. | |
| 2011/0173345 A1 | 7/2011 | Knox et al. | |
| 2013/0073809 A1* | 3/2013 | Antani | G06F 12/121 711/136 |
| 2015/0264154 A1* | 9/2015 | Anand | H04L 67/2852 709/212 |
| 2016/0332344 A1* | 11/2016 | Bernhard | B29C 44/3461 |
| 2018/0239794 A1* | 8/2018 | Hill | G06F 16/2329 |
| 2018/0314647 A1* | 11/2018 | Bedi | G06F 12/123 |

(Continued)

OTHER PUBLICATIONS

Basu, et al., Adaptive TTL-Based Caching for Content Delivery, Apr. 14, 2017, 24 pages. Available at arXiv:1704.04448v1 (www.arXiv.org).

(Continued)

*Primary Examiner* — Joshua Joo (57) ABSTRACT

Among other things, this document describes systems, devices, and methods for improving cache efficiency by automatically discovering and updating time to live (TTL) settings for cached content. TTL values define how long content may be served from a cache before the cache should return to origin to verify the freshness of the content. TTL values may be set by an origin server, using an appropriate HTTP header for example, or by manual configuration action, or otherwise. A cache may adjust this TTL value—or generate a TTL value if none is provided, based at least in part on cache performance characteristics and targets, along with an analysis of the history of purge events.

20 Claims, 6 Drawing Sheets

(56) References Cited

U.S. PATENT DOCUMENTS

2019/0104068 A1* 4/2019 Hofmann ............ H04L 67/2814

OTHER PUBLICATIONS

Basu, et al., Adaptive TTL-Based Caching for Content Delivery, Dec. 9, 2017, 27 pages. Available at arXiv:1704.04448v2 (www.arXiv.org).

Cao, et al., Active Cache: Caching Dynamic Contents on the Web, Technical Report #1363, Mar. 1998, 10 pages. University of Wisconsin.

Cao, et al., Maintaining Strong Cache Consistency in the World Wide Web, IEEE Transactions on Computers, vol. 47, No. 4, Apr. 1998, 13 pages.

Cate, Alex—a Global Filesystem, Carnegie Mellon University, School of Computer Science, 11 pages., Downloaded Feb. 5, 2018. Available at http://citeseerx.ist.psu.edu/viewdoc/download;jsessionid=48FC5FECDCBA9D3B3DBA07C1AC93D964?doi=10.1.1.159.7390&rep=rep1&type=pdf.

Cate, Alex—a Global Filesystem, Carnegie Mellon University, School of Computer Science, 11 pages. Downloaded Feb. 5, 2018 from http://citeseerx.ist.psu.edu/viewdoc/download;jsessionid=48FC5FECDCBA9D3B3DBA07C1AC93D964?doi=10.1.1.159.7390&rep=rep1&type=pdf.

Megiddo, et al., Outperforming LRU with an Adaptive Replacement Cache Algorithm, IEEE Computer Society, 2004, 8 pages. Downloaded on Jan. 11, 2018. Available at http://www.andrew.cmu.edu/course/15-749/READINGS/required/caching/megiddo-computer04.pdf.

Pooja, Kohla et al., Cache Invalidation and Propagation in Distributed caching, 39 pages. Downloaded Feb. 5, 2018, from http://www4.ncsu.edu/~rychirko/Papers/techReport021505.pdf, Citation according to http://www4.ncsu.edu/~rychirko/Papers/techReports.html is Pooja Kohli and Rada Chirkova: Cache Invalidation and Propagation in Distributed Caching, Technical Report NCSU CSC TR-2005-7, Feb. 2005.

Zeng, et al., Efficient web Content Delivery Using Proxy Caching Techniques, Sep. 2004, 12 pages. Available at https://www.researchgate.net/publication/3421573.

* cited by examiner

AUTOMATED TTL ADJUSTMENT USING CACHE PERFORMANCE AND PURGE DATA

BACKGROUND

Technical Field

This application relates generally systems and methods for content caching and more particularly to automatically discovering high performance time to live settings for cached content.

Brief Description of the Related Art

The delivery of content over the Internet can be accelerated by caching content close to end use client devices that may request them. Content delivery networks (CDNs) are a known form of distributed systems that typically comprise a distributed set of servers configured as reverse proxy caches. When an end user client device requests content (such as an HTML file defining the presentation layer of a web page) from a particular server in the CDN, that server looks in its local cache to see if it has a valid (unexpired) copy of the content. If so, the server can serve the content to the client device. If not, the server can fetch the content from an origin server, serve it to the client device, and cache the content for use in responding to future client requests.

For cacheable content, origin servers typically transmit the content with headers (e.g., an HTTP cache header) specifying a time to live (TTL) value for the content. The TTL can also be configured manually on the reverse proxy server, which may or may not override the origin-provided TTL for a particular request, depending on configuration. The TTL specifies how long the cache may use the content before returning to the origin to validate the content (e.g., in case the content has changed). TTL values are typically expressed in seconds, but the value could represent seconds, minutes, hours, days, or otherwise.

After the TTL expires, the cache returns to origin to check whether the content has changed, typically in the form of an if-modified-since (IMS) request. If the content has not changed, then the content can still be used. Nevertheless the IMS request is a wasteful process, as the TTL represented an overly short estimate of how often the content would be updated.

An origin server operator can also "purge" or "invalidate" content from cache. (Note that an origin server operator is also referred to herein as a content provider.) This operation typically takes the form of an explicit instruction issued via an interface to the CDN to immediately purge the content from cache. The CDN's servers will then pull and cache a new version of the content from the origin server in due course, in response to a subsequent client device request therefor. If the operator has to issue a purge because the content provider updated the content—before the TTL expired—then the TTL represented an overly long estimate of how frequently the content would be updated.

Setting an optimal TTL is desirable; if a TTL is too long, then an operator must issue unnecessary purge commands to avoid serving outdated content. If a TTL is too short, then servers must send unnecessary IMS requests to the origin when the content is not outdated.

The teachings hereof related adaptively and automatically generating and/or adjusting the TTL of content to improve cache performance over a static TTL approach. The teachings hereof may be used to generate a TTL where none is provided, and/or to adjust a TTL that is initially provided by an origin server operator.

The generation and/or adjustment of TTL values improves the performance of the cache, which can improve the operation of the server by improving its responsiveness to end user client device requests, efficiently using computer storage (thus reducing the need for increasing such storage), and reducing network usage. The refinement of TTL values can also improve offload from the origin server. Hence the teachings hereof improve the operation of computer hardware and software and computer networks themselves.

Those skilled in the art will understand these and other improvements from the teachings hereof.

BRIEF SUMMARY

Among other things, this document describes systems, devices, and methods for improving cache efficiency by automatically discovering and updating time to live (TTL) settings for cached content. TTL values define how long content may be served from a cache before the cache should return to origin to verify the freshness of the content. TTL values may be set by an origin server, using an appropriate HTTP header for example. A cache may adjust this TTL value—or generate a TTL value if none is provided, based at least in part on cache performance characteristics and targets, along with an analysis of the history of purge events.

A variety of other improvements are described herein. The foregoing is a description of certain non-limiting examples of the teachings hereof for purposes of illustration only; it is not a definition of the invention. The claims define the scope of protection that is sought, and are incorporated by reference into this brief summary.

BRIEF DESCRIPTION OF THE DRAWINGS

The invention will be more fully understood from the following detailed description taken in conjunction with the accompanying drawings, in which.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

Any description of advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, HTTP versions 1.1 and 2, TCP/IP, and UDP, is assumed. The term "server" is used herein to refer to hardware (a computer configured as a server, also referred to as a "server machine") with server software running on such hardware (e.g., a web server). In addition, the term "origin" is used to refer to an origin server. Likewise, the terms "client" and "client device" is used herein to refer to hardware in combination with software (e.g., a browser or player application). While context may indicate the hardware or the software exclusively, should such distinction be appropriate, the teachings hereof can be implemented in any combination of hardware and software.

The term web page or "page" is meant to refer to a presentation defined by an HTML or other markup language document, preferably with embedded or inlined content referenced therein. The term content can mean any file or portion thereof that is independently cacheable, including the markup language file, an image file, a script file, JSON, CSS, video segment, etc.

The term "cache" used below is meant to a computer, typically a server, with a cache. The server may be part of a distributed system configured as a CDN, but that is not necessary.

Introduction

Described below is an example of an algorithm that utilizes purge events to auto discover a high-performance TTL. The term 'high-performance' is used here not to refer to generating the best possible TTL value, but rather to generating an initial TTL value or an adjustment to a TTL value designed to achieve a desired origin offload target and otherwise in accord with the teachings hereof. This will be described more below. The teaching hereof may not be the only input into a TTL algorithm, in other words, the teachings hereof can be combined with the teachings of other adaptive TTL algorithms while still practicing the invention.

In a preferred (but non-limiting) embodiment, the teachings hereof combine performance feedback data with purge information data. We will first define some basic elements of this algorithm (mainly: offload, TTL and purge events, then explain how combining those elements together can help discovering a high-performance TTL setting for a specific content provider and content type.

Offload

Offload is one example of a performance metric. Offload is the measure of traffic that is delivered (e.g., by a cache, collection of caches, or otherwise) on behalf of a content provider relative the to the total traffic that is delivered by the content provider itself via its origin infrastructure. Two traffic types may be define to measure offload: T_tot: Total traffic delivered to the end user client (from all sources) and T_cache: Traffic delivered from a cache (cache hit traffic). The offload ratio is (T_cache/T_tot). For example, if traffic delivered to the end user client is 100 Gbps in throughput and cache hit is 80 Gbps, the offload is 0.8 (80%). Offload is a large source of performance gained from a cache. It provides benefits such as reducing the strain on the content provider's origin infrastructure, increasing effective origin capacity to scale for more users and be resilient to outages due to pressure, and delivering traffic locally from cache and thereby reducing the amount of time needed for content to travel across the Internet, which reduces response time and increases user perceived quality. Offload can also function to shield a content provider origins from DDOS attacks as the cache takes the hit on behalf of the origin.

Time to Live

As mentioned earlier, in the context of caching, a time to live (TTL) is the duration that a cache can keep an associated content in cache and serve it to end users before verifying its freshness with origin. For example, if an image file "image.png" has a time to live of 1 day, the first time an end user client device requests "image.png" from a content provider that is using a CDN, the request is received by the CDN but cannot be served directly, so the request is forwarded to the origin infrastructure of the content provider. The file can be downloaded from the origin server and served to the end user through the cache. The cache keeps a copy of the image file in its local storage (or active memory) for subsequent requests. When subsequent users request the same image file, since the CDN has a local copy of the requested image it is served directly to the end user without contacting the origin infrastructure of the content provider. The TTL limits the amount of time that a CDN can serve a request locally from cache. This limit acts as an expiry date, after which the CDN needs to contact the origin infrastructure again, typically via an IMS request, to get a "fresh" copy of the image file.

TTL's are a part of the settings that a content provider configures in their CDN. TTL's can be defined according to many criteria including type of files (images, videos, etc.). Some customers also provide settings for things that should not be cached at all. The TTL can be set up in an out of band configuration. The TTL can be sent in band by the origin, which means that that when the origin server responds to a cache that is requesting the content, the origin server can include TTL setting as a header with the content.

Purge

Sometimes a content provider may want to remove content immediately from a cache, rather than waiting for TTL expiry. One example is the removal of content deemed inappropriate or erroneous. Such removal requires quasi-instantaneous action to physically delete or force the refresh of a specific content on the caches. Another scenario is the total refresh of a website or catalog where the combination of old contents with new contents on the same page provides an unexpected (and erroneous effects). The content provider initiated removal or refresh of content from the cache is called "purging", sometimes also referred to as cache invalidation.

Purges can be initiated in a variety of ways, for example through a user interface of a CDN, or through an API. The term "purging" also includes purges generated by origin infrastructure. For example, a content provider could employ developer tools that generate a purge to a CDN API whenever an updated piece of content is checked-in by a developer. The tool might be a developer source code and/or content repository, for example.

TTL and purging are often used in conjunction but without direct correlation. The former indicates the "normal" mandate for a cache to keep content for a specific time duration, the latter is an exceptional measure taken to immediately refresh content for various business, technical or other reasons.

Purge Events and High Performance TTL Generation

A high performance TTL is defined for a specific performance target (e.g., offload). If a content provider is seeking a 100% offload ratio, they usually set a significantly high TTL (content that never expires) in order to have their content always and forever served from cache. At a certain point the content becomes too old and stale. When this happens, it is a candidate for refresh. The refresh of content can occur in two ways:

The content provider can wait till the TTL expires and the cache naturally refreshes the content.

The content provider can issue (via a user interface and/or APL for example) a "purge" request to the cache to force the refresh (or removal) of stale content.

Refreshing content naturally forces the cache to contact the origin infrastructure to fetch content. This decreases the offload being provided by the cache to the origin.

Let's consider a case where the TTL is set too high to seek a high offload but the content provider is issuing frequent purge requests to alleviate the high TTL. The purge request implicates an immediate loss of benefit and performance of the cache: as soon as the caches are warmed up, they are cooled down by a purge event. If we can observe the frequency of purge events and detect a pattern (e.g., a daily purge is issued everyday at 9:00 AM) we can automatically set the TTL to a little less than one day to have the cache naturally reach its target performance in terms of offload all while responding automatically to the business patterns and purges issued by the content provider. If such a system is built, there will be little or no need for manual TTL settings or adjustment. The TTL is discovered automatically by "listening" to the purge events issued by the content provider, preferably for a time period long enough to reach stable operation. The time period could be a predetermined setting or the stability of the TTL could be detected in operation and the "listening" can then be stopped.

With the foregoing by way of introduction, the teachings hereof will now be described in more detail.

Algorithm Example

To illustrate an algorithm, let's consider the following case: the initial (set) TTL value for a specific content provider is 2 days; the Target Offload is 80% at peak hour with a 50% variation; purge events are done daily initially.

Case 1—Daily Purge Events

Figure 1:
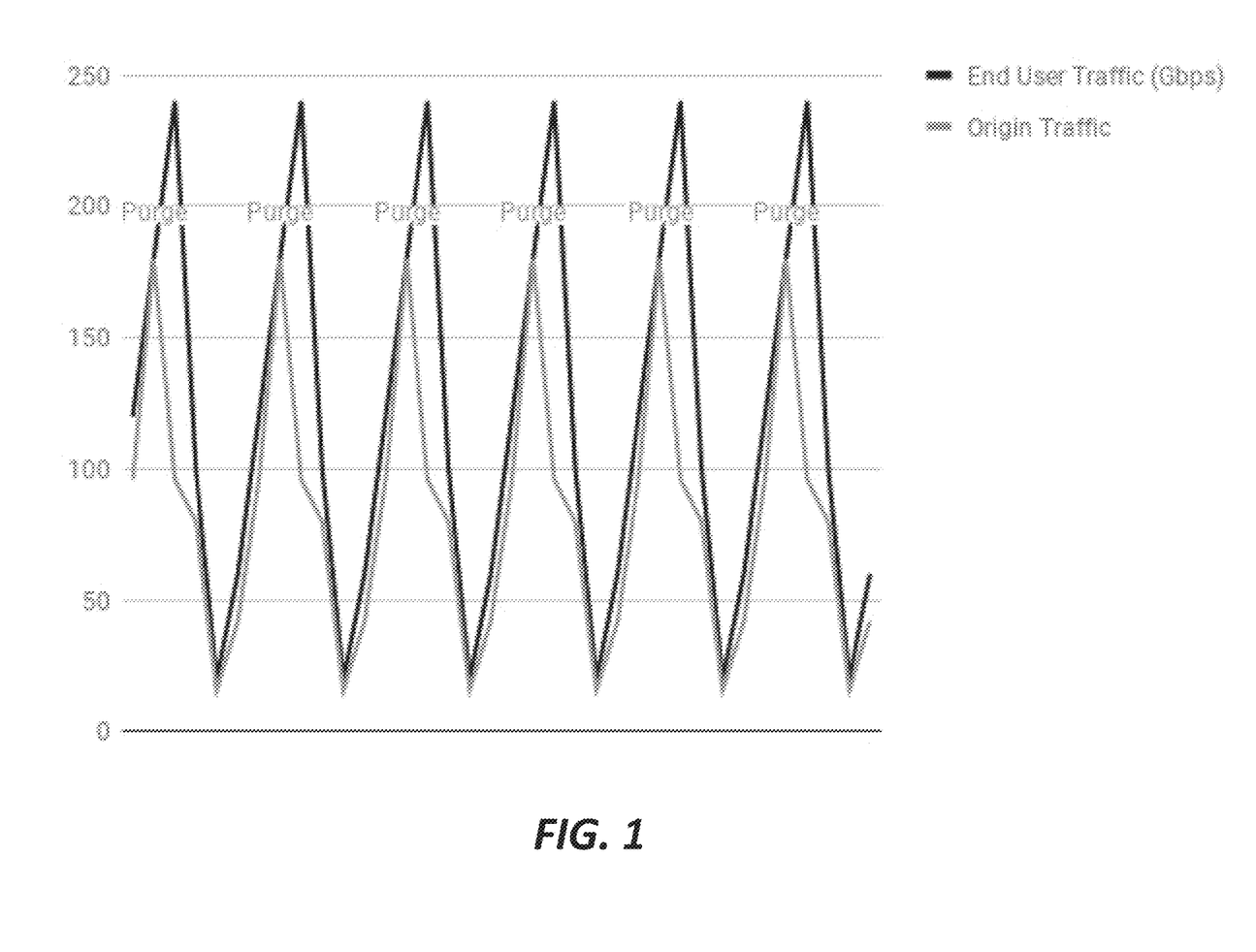
FIG. 1 is a chart of end user client device request traffic seen by a cache for a particular origin server content versus the traffic actually seen by the origin server (the difference reflecting offload), with purge events occurring from time to time.

Consider the following data-points for this content provider, which are illustrated in the chart shown in FIG. 1.

Table For FIG. 1

| Time Stamp | End User Traffic (Gbps) | Offload rate | Origin Traffic | Event |
|---|---|---|---|---|
| 1517340985 | 120 | 0.2 | 96 | |
| 1517355385 | 180 | 0 | 180 | Purge |
| 1517369785 | 240 | 0.6 | 96 | |
| 1517384185 | 100 | 0.2 | 80 | |
| 1517398585 | 20 | 0.2 | 16 | |
| 1517412985 | 60 | 0.3 | 42 | |
| 1517427385 | 120 | 0.2 | 96 | |
| 1517441785 | 180 | 0 | 180 | Purge |
| 1517456185 | 240 | 0.6 | 96 | |
| 1517470585 | 100 | 0.2 | 80 | |
| 1517484985 | 20 | 0.2 | 16 | |
| 1517499385 | 60 | 0.3 | 42 | |
| 1517513785 | 120 | 0.2 | 96 | |
| 1517528185 | 180 | 0 | 180 | Purge |
| 1517542585 | 240 | 0.6 | 96 | |
| 1517556985 | 100 | 0.2 | 80 | |
| 1517571385 | 20 | 0.2 | 16 | |
| 1517585785 | 60 | 0.3 | 42 | |
| 1517600185 | 120 | 0.2 | 96 | |
| 1517614585 | 180 | 0 | 180 | Purge |
| 1517628985 | 240 | 0.6 | 96 | |
| 1517643385 | 100 | 0.2 | 80 | |
| 1517657785 | 20 | 0.2 | 16 | |
| 1517672185 | 60 | 0.3 | 42 | |
| 1517686585 | 120 | 0.2 | 96 | |
| 1517700985 | 180 | 0 | 180 | Purge |
| 1517715385 | 240 | 0.6 | 96 | |
| 1517729785 | 100 | 0.2 | 80 | |
| 1517744185 | 20 | 0.2 | 16 | |
| 1517758585 | 60 | 0.3 | 42 | |
| 1517772985 | 120 | 0.2 | 96 | |
| 1517787385 | 180 | 0 | 180 | Purge |
| 1517801785 | 240 | 0.6 | 96 | |
| 1517816185 | 100 | 0.2 | 80 | |
| 1517830585 | 20 | 0.2 | 16 | |
| 1517844985 | 60 | 0.3 | 42 | |

According to the data the purge events cause the offload to dip every day back to 0% increasing the spike on the origin traffic when the purge occurs. See FIG. 1.

Case 2—Natural TTL Expiry

Figure 2:
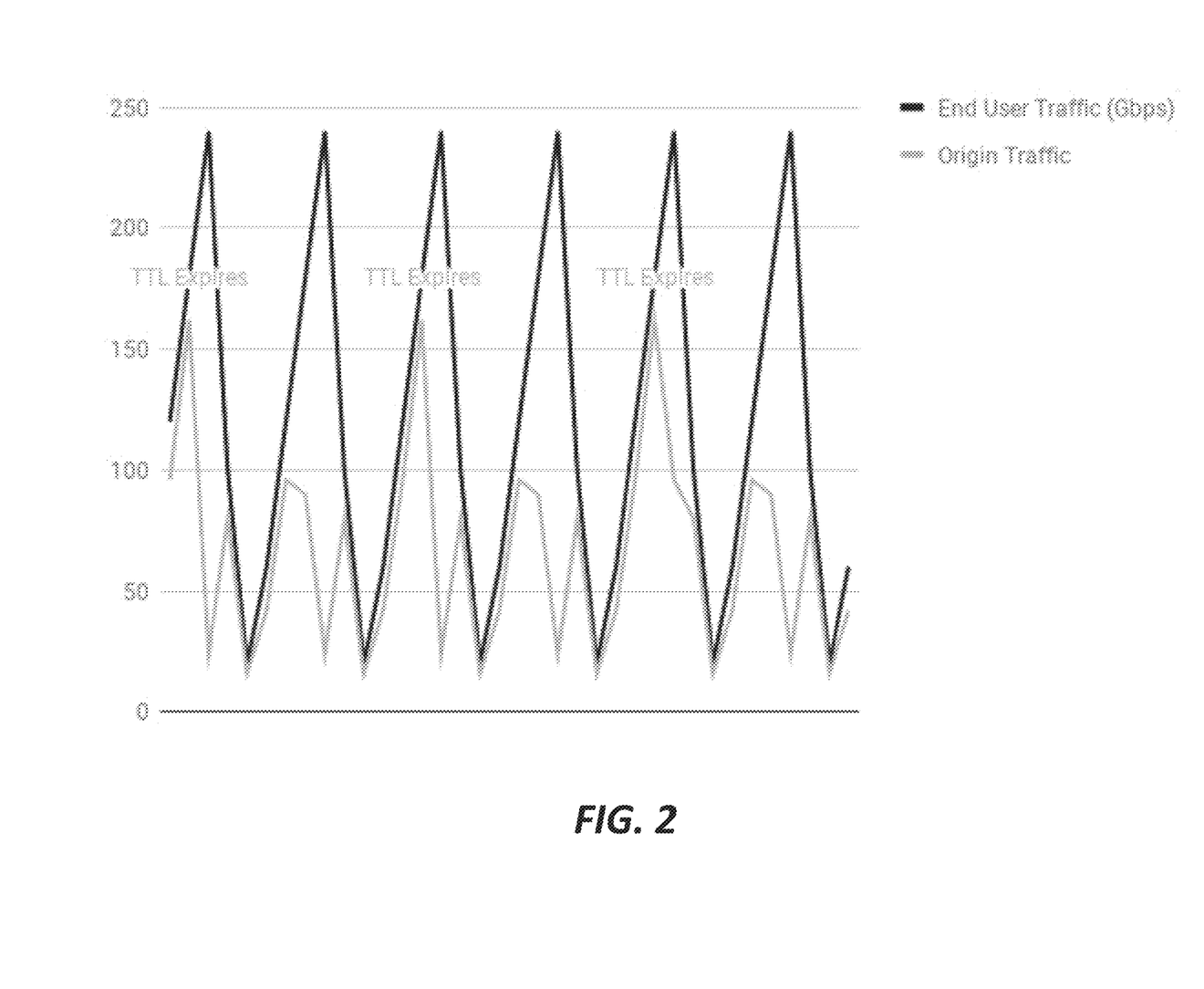
FIG. 2 is a chart of end user client device request traffic seen by a cache for a particular origin server content versus the traffic actually seen by the origin server (the difference reflecting offload), without purge events occurring from time to time.

Now let's consider for the sake of discussion that there are no purge events and we let the TTL expire naturally. The data points for the same customer will be the following:

Table For FIG. 2

| Time Stamp | End User Traffic (Gbps) | Offload rate | Origin Traffic | Event |
|---|---|---|---|---|
| 1517340985 | 120 | 0.2 | 96 | |
| 1517355385 | 180 | 0.1 | 162 | TTL Expires |
| 1517369785 | 240 | 0.9 | 24 | |
| 1517384185 | 100 | 0.2 | 80 | |
| 1517398585 | 20 | 0.2 | 16 | |
| 1517412985 | 60 | 0.3 | 42 | |
| 1517427385 | 120 | 0.2 | 96 | |
| 1517441785 | 180 | 0.5 | 90 | |
| 1517456185 | 240 | 0.9 | 24 | |
| 1517470585 | 100 | 0.2 | 80 | |
| 1517484985 | 20 | 0.2 | 16 | |
| 1517499385 | 60 | 0.3 | 42 | |
| 1517513785 | 120 | 0.2 | 96 | |
| 1517528185 | 180 | 0.1 | 162 | TTL Expires |
| 1517542585 | 240 | 0.9 | 24 | |
| 1517556985 | 100 | 0.2 | 80 | |
| 1517571385 | 20 | 0.2 | 16 | |
| 1517585785 | 60 | 0.3 | 42 | |

Table For FIG. 2

| Time Stamp | End User Traffic (Gbps) | Offload rate | Origin Traffic | Event |
|---|---|---|---|---|
| 1517600185 | 120 | 0.2 | 96 | |
| 1517614585 | 180 | 0.5 | 90 | |
| 1517628985 | 240 | 0.9 | 24 | |
| 1517643385 | 100 | 0.2 | 80 | |
| 1517657785 | 20 | 0.2 | 16 | |
| 1517672185 | 60 | 0.3 | 42 | |
| 1517686585 | 120 | 0.2 | 96 | |
| 1517700985 | 180 | 0.1 | 162 | TTL Expires |
| 1517715385 | 240 | 0.6 | 96 | |
| 1517729785 | 100 | 0.2 | 80 | |
| 1517744185 | 20 | 0.2 | 16 | |
| 1517758585 | 60 | 0.3 | 42 | |
| 1517772985 | 120 | 0.2 | 96 | |
| 1517787385 | 180 | 0.5 | 90 | |
| 1517801785 | 240 | 0.9 | 24 | |
| 1517816185 | 100 | 0.2 | 80 | |
| 1517830585 | 20 | 0.2 | 16 | |
| 1517844985 | 60 | 0.3 | 42 | |

According to the data in the Table for FIG. 2, the TTL expiry every two days will dip the offload to 10% increasing the spike on the origin traffic when the purge occurs but it's less expensive overall. The peak offload obtained is 90% which is higher than the target. This is illustrated in FIG. 2.

Case 3: Automatic Discovery of TTL

Finally let's consider that every time there is a purge action we take corrective action by decreasing the TTL by half a day until the purge events cease. This case assumes that the content provider realizes they no longer need to purge their content since the caches have the right TTL that will naturally refresh the content. The following data illustrate this case.

Figure 3:
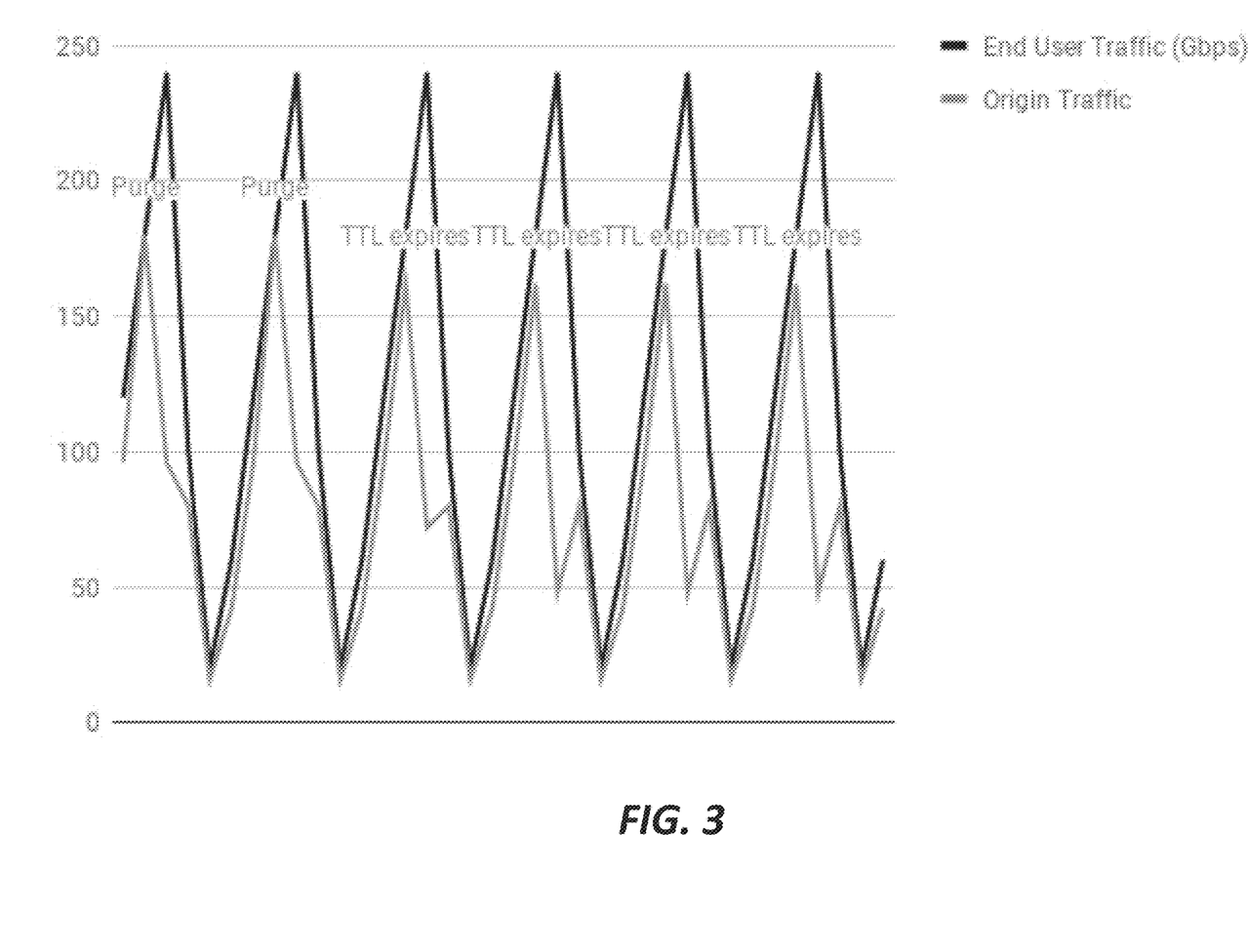
FIG. 3 is a chart of end user client device request traffic seen by a cache for a particular origin server content versus the traffic actually seen by the origin server (the difference reflecting offload), with TTL being adjusted over time.

Table for FIG. 3

| Time Stamp | End User Traffic (Gbps) | Offload rate | Origin Traffic | Event | Configuration Action |
|---|---|---|---|---|---|
| 1517340985 | 120 | 0.2 | 96 | | |
| 1517355385 | 180 | 0 | 180 | Purge | 1-½ day TTL |
| 1517369785 | 240 | 0.6 | 96 | | |
| 1517384185 | 100 | 0.2 | 80 | | |
| 1517398585 | 20 | 0.2 | 16 | | |
| 1517412985 | 60 | 0.3 | 42 | | |
| 1517427385 | 120 | 0.2 | 96 | | |
| 1517441785 | 180 | 0 | 180 | Purge | 1 day TTL |
| 1517456185 | 240 | 0.6 | 96 | | |
| 1517470585 | 100 | 0.2 | 80 | | |
| 1517484985 | 20 | 0.2 | 16 | | |
| 1517499385 | 60 | 0.3 | 42 | | |
| 1517513785 | 120 | 0.2 | 96 | | |
| 1517528185 | 180 | 0.1 | 162 | TTL expires | |
| 1517542585 | 240 | 0.8 | 72 | | |
| 1517556985 | 100 | 0.2 | 80 | | |
| 1517571385 | 20 | 0.2 | 16 | | |
| 1517585785 | 60 | 0.3 | 42 | | |
| 1517600185 | 120 | 0.2 | 96 | | |
| 1517614585 | 180 | 0.1 | 162 | TTL expires | |
| 1517628985 | 240 | 0.8 | 48 | | |
| 1517643385 | 100 | 0.2 | 80 | | |
| 1517657785 | 20 | 0.2 | 16 | | |
| 1517672185 | 60 | 0.3 | 42 | | |
| 1517686585 | 120 | 0.2 | 96 | | |
| 1517700985 | 180 | 0.1 | 162 | TTL expires | |
| 1517715385 | 240 | 0.8 | 48 | | |
| 1517729785 | 100 | 0.2 | 80 | | |
| 1517744185 | 20 | 0.2 | 16 | | |
| 1517758585 | 60 | 0.3 | 42 | | |
| 1517772985 | 120 | 0.2 | 96 | | |
| 1517787385 | 180 | 0.1 | 162 | TTL expires | |
| 1517801785 | 240 | 0.8 | 48 | | |
| 1517816185 | 100 | 0.2 | 80 | | |
| 1517830585 | 20 | 0.2 | 16 | | |
| 1517844985 | 60 | 0.3 | 42 | | |

The ceasing of purge events helps the system converge to a pattern of refreshing that does not require manual intervention for refreshing the content and we progressively reach our target offload at peak hour, as illustrated in FIG. 3.

Description of TTL Algorithm.

This section provides a formal description of a TTL algorithm, at least in one embodiment. Initially the target offload peak hour period initial TTL and an initial TTL step size are given. There are two levers in place:

A purge event causes the TTL to decrease by a determined amount (decrease by the TTL step).

Failure to meet the offload target causes the TTL to increase by a determined amount (increase by the TTL step). The offload target is preferably measured during a particular time period that is configured by the content provider. For example, a content provider might designate a minimum offload target to achieve during prime time hours for entertainment, such as between 6:00 pm and 11:00 pm.

Because the purge event and the peak offload targets have conflicting effects, and to avoid the divergence of the system (yo-yo effect), preferably a purge event also decreases the TTL step size. For example if the TTL step size was half a day but this still triggered a purge event we will decrease the step size by half (four hours) and observe the offload and increase TTL further if needed using that new step size. An illustrative flow chart is provided in FIG. 4.

Generating and/or Adjusting a TTL Based on Period of Observation

Figure 4:
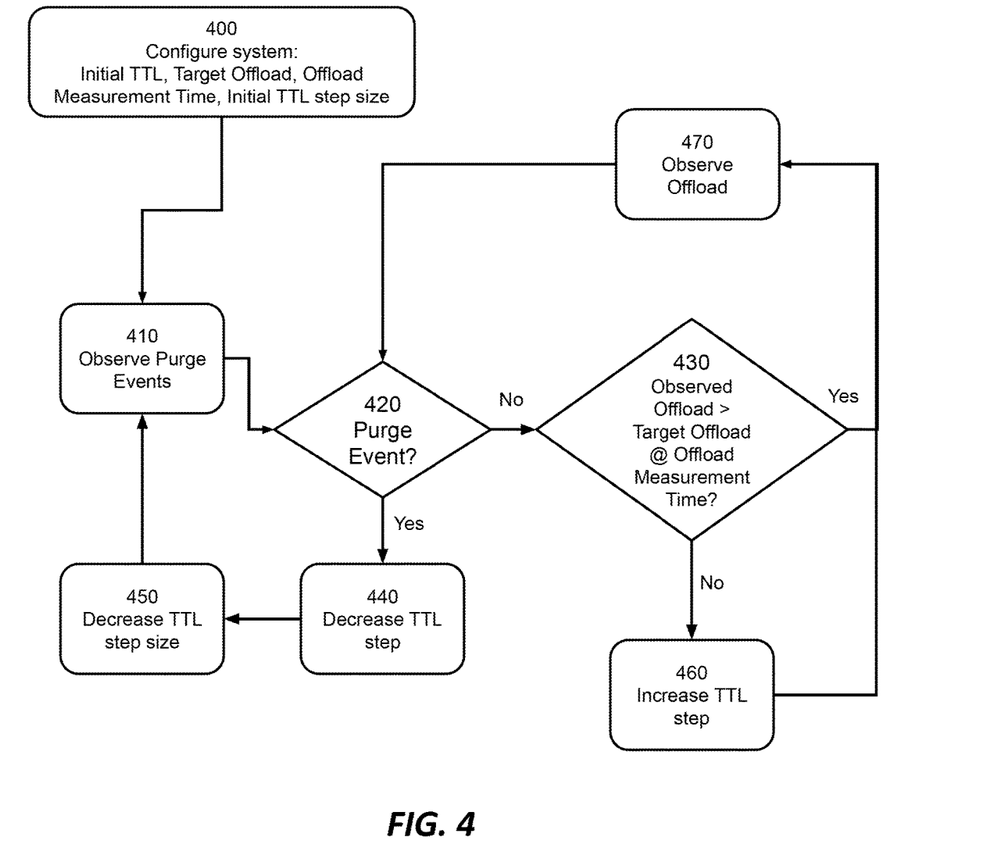
FIG. 4 is a diagram illustrating processing steps for generating and/or adjusting a TTL value for cached content, in one embodiment; and, FIG. 5 is a block diagram of a content delivery network (CDN) in which the teachings hereof may be implemented; and, FIG. 6 is a block diagram illustrating hardware in a computer system that may be used to implement the teachings hereof.

Preferably, the process illustrated in FIG. 4 is run for a period of time. It may be done by a cache (i.e., in a server). A given cache may share the generated TTL with other caches (e.g., peer caches in a data center, or otherwise). The process can be run for a configured period of time to produce the high performance TTL, or until the TTL is considered stable. After that point, the monitoring of purges and offload can be paused (e.g., to save processing) and the learned, stable TTL can be used thereafter without modification. At a later time, the process can be restarted to check whether the TTL is still right. However, in other embodiments, the process can be run continuously such that it is always monitoring for purge events, which allows the system to continually auto-discover and adapt the TTL.

It should be understood that the "purge" input into the process can be manual purges received from a user interface accessed by the content provider, e.g., via a CDN portal. Purges can also be received from the content provider via automated interface, e.g., via a communication channel between the cache and a content repository or other component of origin infrastructure. The "update" to a piece of content in the content repository (e.g, by a web developer updating content on a website) can then trigger the purge automatically. Either way, a change in the initial assumptions (such as a content provider action to increase the TTL or a change in the pattern of purges) causes the system to trigger actions and adjust to the new pattern until it reaches a stable state.

It should also be understood that the process in FIG. 4 can be used to adjust an initially provided TTL (e.g, specified by the content provider in a header). Alternatively, in the absence of an initial TTL from the content provider, the process can set the TTL to be some predetermined amount (a default value of one day, for example) and then the TTL discovery process can be activated to refine the TTL.

Although the teachings above can be used to achieve a stable system with no action, that is not necessarily important. The cache could still see and will see changes inherent to the nature of the content and the behavior of the content provider. It will adapt to the new status all while minimizing the need to manually take action to change the configurations.

Use in Content Delivery Networks

As noted above, the teachings hereof may be implemented in a system in a CDN having many caches. A description of a conventional CDN is now provided.

A CDN is a distributed computer system and it can be (but does not have to be) operated and managed by a service provider. A "distributed system" of this type typically refers to a collection of autonomous computers linked by a network or networks, together with the software, systems, protocols and techniques designed to facilitate various services, such as content delivery or the support of site infrastructure. The infrastructure can be shared by multiple tenants, typically referred to as the content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence. The CDN processes may be located at nodes that are publicly-routable on the Internet, within or adjacent to nodes that are located in mobile networks, in or adjacent to enterprise-based private networks, or in any combination thereof.

Figure 5:
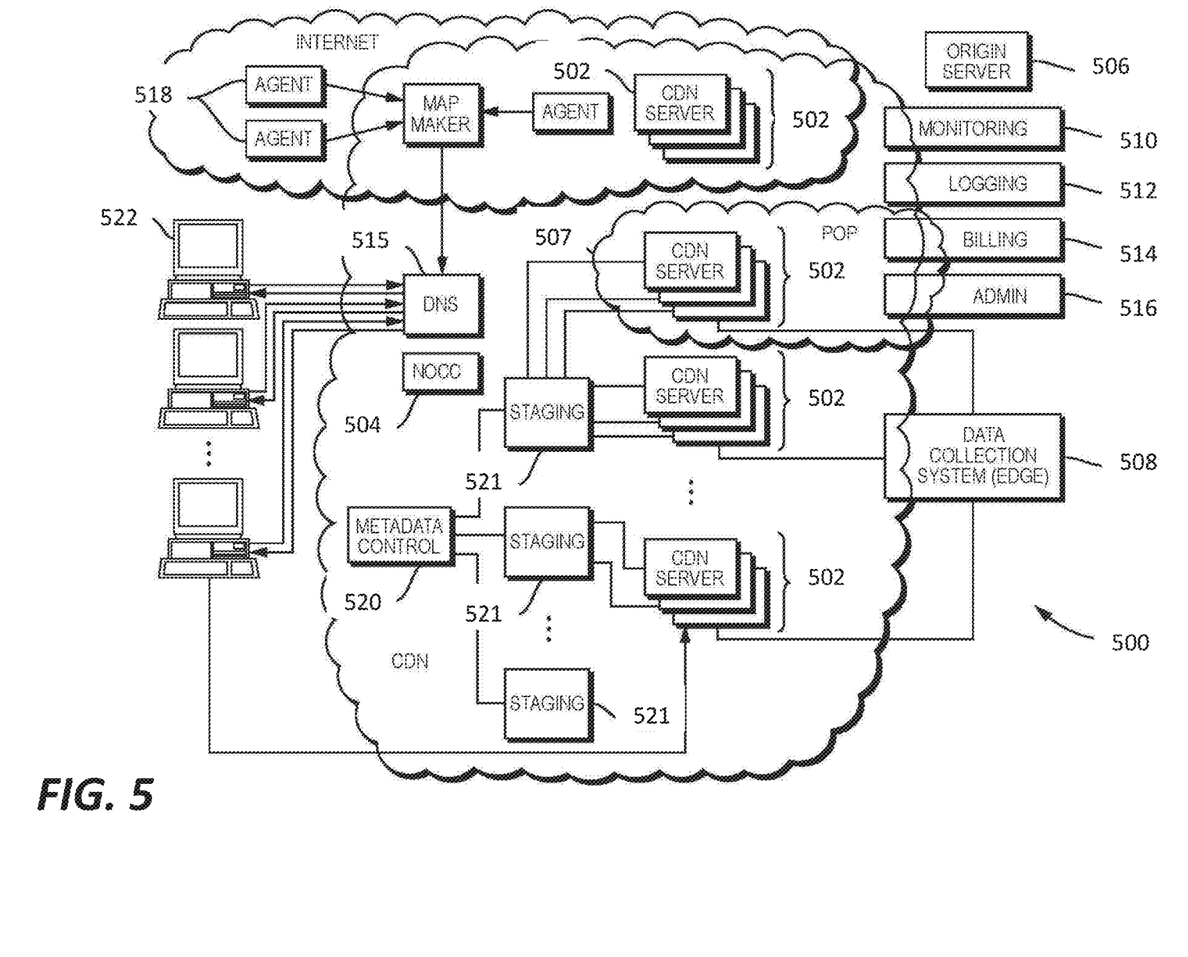

In a known system such as that shown in FIG. 5, a distributed computer system 500 is configured as a content delivery network (CDN) and is assumed to have a set of machines 502 distributed around the Internet. The machines 502 are servers with caches. Typically, most of the machines are configured as servers and located near the edge of the Internet, i.e., at or adjacent end user access networks. A network operations command center (NOCC) 504 may be used to administer and manage operations of the various machines in the system. Third party sites affiliated with content providers, such as web site 506, offload delivery of content (e.g., HTML or other markup language files, embedded page objects like an image file or CSS file or javascript), streaming media, software downloads, and the like) to the distributed computer system 500 and, in particular, to the servers 502 (which are sometimes referred to as content servers, or sometimes as "edge" servers in light of the possibility that they are near an "edge" of the Internet). Such servers may be grouped together into a point of presence (POP) 507.

Typically, content providers offload their content delivery by aliasing (e.g., by a DNS CNAME) given content provider domains or sub-domains to domains that are managed by the service provider's authoritative domain name service. End user client machines 522 that desire such content may be directed to the distributed computer system to obtain that content more reliably and efficiently. The CDN servers respond to the client requests, for example by obtaining requested content from a local cache, from another CDN server, from the origin server 106, or other source.

Although not shown in detail in FIG. 5, the distributed computer system may also include other infrastructure, such as a distributed data collection system 508 that collects usage and other data from the CDN servers, aggregates that data across a region or set of regions, and passes that data to other back-end systems 510, 512, 514 and 516 to facilitate monitoring, logging, alerts, billing, management and other operational and administrative functions. Distributed network agents 518 monitor the network as well as the server loads and provide network, traffic and load data to a DNS query handling mechanism 515, which is authoritative for content domains being managed by the CDN. A distributed data transport mechanism 520 may be used to distribute control information (e.g., metadata to manage content, to facilitate load balancing, and the like) to the CDN servers.

A given machine in the CDN comprises commodity hardware (e.g., a microprocessor) running an operating system kernel (such as Linux® or variant) that supports one or more applications. To facilitate content delivery services, for example, given machines typically run a set of applications, such as an HTTP proxy, a name server, a local monitoring process, a distributed data collection process, and the like. The HTTP proxy (sometimes referred to herein as a global host or "ghost") typically includes a manager process for managing a cache and delivery of content from the machine. For streaming media, the machine typically includes one or more media servers, as required by the supported media formats.

A given CDN server 502 may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN.

In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server associated with the IP address. The request includes a Host header that includes the original content provider domain or sub-domain. Upon receipt of the request with the Host header, the CDN server checks its configuration file to determine whether the content domain or sub-domain requested is actually being handled by the CDN. If so, the CDN server applies its content handling rules and directives for that domain or sub-domain as specified in the configuration. These content handling rules and directives may be located within an XML-based "metadata" configuration file, as described previously. Thus, the domain name or subdomain name in the request is bound to (associated with) a particular configuration file, which contains the rules, settings, etc., that the CDN server should use for that request.

As an overlay, the CDN resources may be used to facilitate wide area network (WAN) acceleration services between enterprise data centers (which may be privately managed) and to/from third party software-as-a-service (SaaS) providers.

CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud (e.g., from a SaaS provider). To accomplish these two use cases, CDN software may execute on machines (potentially in virtual machines running on customer hardware) hosted in one or more customer data centers, and on machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the CDN service provider's other infrastructure (e.g., network and operations facilities). This type of managed solution provides an enterprise with the opportunity to take advantage of CDN technologies with respect to their company's intranet, providing a wide-area-network optimization solution. This kind of solution extends acceleration for the enterprise to applications served anywhere on the Internet. By bridging an enterprise's CDN-based private overlay network with the existing CDN public internet overlay network, an end user at a remote branch office obtains an accelerated application end-to-end.

The CDN may have a variety of other features and adjunct components. For example the CDN may include a network storage subsystem (sometimes referred to herein as "Net-Storage") which may be located in a network datacenter accessible to the CDN servers, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference. Communications between CDN servers and/or across the overlay may be enhanced or improved using techniques such as described in U.S. Pat. Nos. 6,820,133, 7,274,658, 7,660,296, the disclosures of which are incorporated herein by reference.

For live streaming delivery, the CDN may include a live delivery subsystem, such as described in U.S. Pat. No. 7,296,082, and U.S. Publication No. 2011/0173345, the disclosures of which are incorporated herein by reference.

Computer Based Implementation

The teachings hereof may be implemented using conventional computer systems, but modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code, such as the "interpreter" referenced above.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 6:
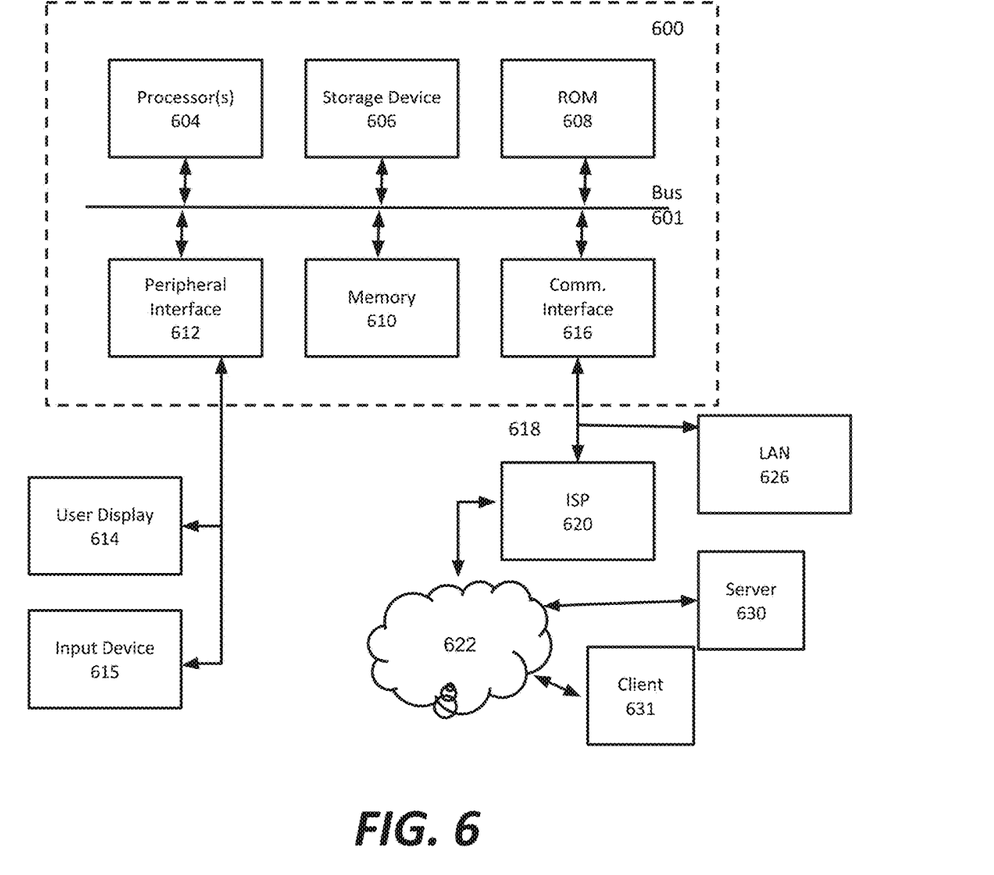

FIG. 6 is a block diagram that illustrates hardware in a computer system 600 upon which such software may run in order to implement embodiments of the invention. The computer system 600 may be embodied in a client device, server, personal computer, workstation, tablet computer, mobile or wireless device such as a smartphone, network device, router, hub, gateway, or other device. Representative machines on which the subject matter herein is provided may be computers running a Linux or Linux-variant operating system and one or more applications to carry out the described functionality.

Computer system 600 includes a microprocessor 604 coupled to bus 601. In some systems, multiple processor and/or processor cores may be employed. Computer system 600 further includes a main memory 610, such as a random access memory (RAM) or other storage device, coupled to the bus 601 for storing information and instructions to be executed by processor 604. A read only memory (ROM) 608 is coupled to the bus 601 for storing information and instructions for processor 604. A non-volatile storage device 606, such as a magnetic disk, solid state memory (e.g., flash memory), or optical disk, is provided and coupled to bus 601 for storing information and instructions. Other application-specific integrated circuits (ASICs), field programmable gate arrays (FPGAs) or circuitry may be included in the computer system 600 to perform functions described herein.

A peripheral interface 612 communicatively couples computer system 600 to a user display 614 that displays the output of software executing on the computer system, and an input device 615 (e.g., a keyboard, mouse, trackpad, touchscreen) that communicates user input and instructions to the computer system 600. The peripheral interface 612 may include interface circuitry, control and/or level-shifting logic for local buses such as RS-485, Universal Serial Bus (USB), IEEE 1394, or other communication links.

Computer system 600 is coupled to a communication interface 616 that provides a link (e.g., at a physical layer, data link layer) between the system bus 601 and an external communication link. The communication interface 616 provides a network link 618. The communication interface 616 may represent a Ethernet or other network interface card (NIC), a wireless interface, modem, an optical interface, or other kind of input/output interface.

Network link 618 provides data communication through one or more networks to other devices. Such devices include other computer systems that are part of a local area network (LAN) 626. Furthermore, the network link 618 provides a link, via an internet service provider (ISP) 620, to the Internet 622. In turn, the Internet 622 may provide a link to other computing systems such as a remote server 630 and/or a remote client 631. Network link 618 and such networks may transmit data using packet-switched, circuit-switched, or other data-transmission approaches.

In operation, the computer system 600 may implement the functionality described herein as a result of the processor executing code. Such code may be read from or stored on a non-transitory computer-readable medium, such as memory 610, ROM 08, or storage device 06. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 18 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method for adjusting a time to live value associated with cacheable content, the method performed by a computer, the method comprising:
A. receiving and storing a time to live (TTL) value for content, the content being from an origin server, the TTL value being received from any of the origin server and a content provider associated with the origin server via an interface;
B. receiving an origin server offload target;
C. monitoring for the receipt of commands to purge the content from a cache, the commands having been initiated by the content provider;
D. monitoring origin server offload against the offload target during a time period;
E. generating two or more adjustments to the TTL value for the content, said generation of two or more adjustments occurring over time, said generation of two or more adjustments comprising:
a. upon receipt of a command to purge the content from the cache, decreasing the TTL value by a first amount; and,
b. upon a determination that the offload fails to meet the offload target, increasing the TTL value by a second amount;
F. adjusting the TTL value for the content by the two or more adjustments.

2. The method of claim 1, wherein said generation of two or more adjustments comprises:
upon the receipt of the command to purge the content from the cache recited in (a), decreasing the size of the first amount, which is to be used when decreasing the TTL value upon receipt of a subsequent command to purge the content from the cache.

3. The method of claim 1, wherein the first amount is equal to the second amount.

4. The method of claim 1, wherein the first amount comprises a step.

5. The method of claim 1, wherein the cache is local to the computer on which the method is executed.

6. The method of claim 1, wherein the cache is remote from the computer, and said adjusting the TTL value by the two or more adjustments comprises sending to the cache over a network interface, any of: (i) the two or more adjustments and (ii) two or more modified TTL values incorporating the two or more adjustments.

7. The method of claim 1, wherein the monitoring of the offload comprises periodically determining a proportion of client request traffic for the content that is being served from the cache relative to the origin server.

8. The method of claim 1, further comprising, in (A), receiving the TTL value for the content from the origin server.

9. The method of claim 1, further comprising, in (A), receiving the TTL value for the content from a user via an interface for configuring the method of adjusting the time to live value.

10. The method of claim 1, further comprising receiving the offload target for the content in (B) from the content provider via an interface.

11. The method of claim 1, wherein the command to purge the content recited in (a) is received via an automated interface from the origin upon an update to the content in the origin infrastructure.

12. A system for adjusting a time to live value associated with cacheable content, the method performed by a computer, the system comprising:
A. one or more first computers comprising circuitry forming one or more processors and a memory device storing instructions for execution on the one or more processors, upon execution the instructions causing the one or more first computers to:
a. provide an interface for a content provider to configure an offload target for an origin server associated with the content provider;

b. provide an interface for the content provider to initiate a purge of content;

B. one or more second computers comprising circuitry forming one or more processors and a memory device storing instructions for execution on the one or more processors, upon execution the instructions causing the one or more second computers to:
   a. receive and store a time to live (TTL) value for the content, the content being from the origin server associated with the content provider, the TTL value being received from any of the origin server and the content provider via the one or more first computers;
   b. receive the offload target;
   c. monitor for the receipt of commands to purge the content from a cache, the commands having been initiated by the content provider via the one or more first computers;
   d. monitor origin server offload against the offload target during a time period;
   e. generate two or more adjustments to the TTL value for the content, said generation of two or more adjustments occurring over time, said generation of two or more adjustments comprising:
      i. upon receipt of a command to purge the content from the cache, decreasing the TTL value by a first amount; and,
      ii. upon a determination that the offload fails to meet the offload target, increasing the TTL value by a second amount;
   f. adjust the TTL value for the content by the two or more adjustments.

13. The system of claim 12, wherein said generation of two or more adjustments comprises:
upon the receipt of the command to purge the content from the cache recited in (a), decreasing the size of the first amount, which is to be used when decreasing the TTL value upon receipt of a subsequent command to purge the content from the cache.

14. The system of claim 12, wherein the first amount is equal to the second amount.

15. The system of claim 12, wherein the cache is local to the one or more second computers.

16. The system of claim 12, wherein the cache is remote from the one or more second computers, and said adjusting the TTL value by the two or more adjustments comprises sending to the cache over a network interface, any of: (i) the two or more adjustments and (ii) two or more modified TTL values incorporating the two or more adjustments.

17. The system of claim 12, wherein the monitoring of the offload comprises periodically determining a proportion of client request traffic for the content that is being served from the cache relative to the origin server.

18. The system of claim 12, further comprising, in (B.a), the receiving the TTL value for the content comprising receiving the TTL value for the content from the origin server.

19. The system of claim 12, further comprising, in (B.a), the receiving the TTL value for the content comprising receiving the TTL value for the content from the content provider via the one or more first computers.

20. The system of claim 12, wherein the interface for the content provider to initiate a purge of content comprises any of a user interface and an application programming interface (API).

* * * * *